US008538397B2

(12) United States Patent
George et al.

(10) Patent No.: US 8,538,397 B2
(45) Date of Patent: *Sep. 17, 2013

(54) SYSTEM AND METHOD FOR IN-BAND MODEM TO MODEM COMMUNICATION

(71) Applicant: Research In Motion Limited, Waterloo (CA)

(72) Inventors: Richard John George, Waterloo (CA); Sean Bartholomew Simmons, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/684,221

(22) Filed: Nov. 22, 2012

(65) Prior Publication Data

US 2013/0084841 A1   Apr. 4, 2013

Related U.S. Application Data

(63) Continuation of application No. 13/445,437, filed on Apr. 12, 2012, now Pat. No. 8,340,647, which is a continuation of application No. 12/754,790, filed on Apr. 6, 2010, now Pat. No. 8,180,331.

(51) Int. Cl.
*H04M 3/42* (2006.01)
(52) U.S. Cl.
USPC ........ 455/416; 455/557; 455/403; 455/422.1; 455/434; 455/414.1
(58) Field of Classification Search
USPC .................. 455/422.1, 403, 414.1, 557, 563, 455/416; 370/310, 328, 338
See application file for complete search history.

(56) References Cited

U.S. PATENT DOCUMENTS

| 2005/0124326 A1 | 6/2005 | Belkin et al. |
| 2007/0070980 A1 | 3/2007 | Phelps et al. |
| 2008/0108389 A1 | 5/2008 | Preston et al. |
| 2010/0039949 A1 | 2/2010 | Rabipour et al. |

FOREIGN PATENT DOCUMENTS

| WO | 2003075130 A2 | 9/2003 |
| WO | 2008036558 A2 | 3/2008 |

OTHER PUBLICATIONS

Canadian Intellectual Property Office, Examiner's Requisition dated Jan. 23, 2013, issued in Canadian Patent Application No. 2,734,146.
European Patent Office, Extended European Search Report issued in respect of European Patent Application No. 10159122.0, dated Sep. 14, 2010.
Matias Erny Reichl Hoffman, Response to Extended European Search Report issued in respect of European Patent Application No. 10159122.0, dated Nov. 29, 2010.
European Patent Office, Notice of Intent to Grant issued in respect of European Patent Application No. 10159122.0, dated Dec. 8, 2011.

(Continued)

*Primary Examiner* — Kathy Wang-Hurst
(74) *Attorney, Agent, or Firm* — Norton Rose Fulbright Canada LLP

(57) ABSTRACT

Systems, methods and programmed instructions are disclosed useful for transmitting signals representing data messages to and from a wireless handheld telephony device along a first call leg of a communication session previously established between the wireless handheld telephony device and at least one second telephony device, the communication session being controlled by a call control server.

18 Claims, 8 Drawing Sheets

(56) References Cited

OTHER PUBLICATIONS

Michael Thier, Office Action issued in respect of U.S. Appl. No. 12/754,790, dated Oct. 25, 2011.
Norton Rose, Response to Office Action, filed in respect of U.S. Appl. No. 12/754,790, dated Jan. 18, 2012.
Michael Thier, Notice of Allowance issued in respect of U.S. Appl. No. 12/754,790, dated Feb. 24, 2012.
European Patent Office, Decision to Grant dated May 7, 2012, in respect of European Patent Application No. 10159122.0.
Norton Rose, Preliminary Amendment dated Apr. 12, 2012, filed in U.S. Appl. No. 13/445,437.
United States Patent and Trademark Office, Office Action dated Jul. 23, 2012, issued in U.S. Appl. No. 13/445,437.
Norton Rose, Response dated Sep. 21, 2012, filed in U.S. Appl. No. 13/445,437.
United States Patent and Trademark Office, Notice of Allowance dated Oct. 2, 2012, issued in U.S. Appl. No. 13/445,437.

SYSTEM AND METHOD FOR IN-BAND MODEM TO MODEM COMMUNICATION

CROSS-REFERENCE TO RELATED APPLICATIONS

This application is a continuation of U.S. patent application Ser. No. 13/445,437, filed Apr. 12, 2012, which is a continuation of U.S. patent application Ser. No. 12/754,790, filed Apr. 6, 2010 and entitled "SYSTEM AND METHOD FOR IN-BAND MODEM TO MODEM COMMUNICATION" now U.S. Pat. No. 8,180,331, all of which are hereby incorporated by reference in its entirety.

FIELD

The present application relates generally to mobile communication devices and, more particularly to systems and methods for in-band modem to modem communications during voice communication sessions.

BACKGROUND

Technology exists for routing communications originating from a wireless handheld telephony device through a server such as an enterprise server. This can be done, for example, to make it appear as if the communication originated from a user's place of business or to prevent a party receiving the communication from accessing the wireless user's wireless number. Often, such communications will use both an audio or voice channel for relaying a voice communication and a data channel for, for example, sending control information between the server and the wireless handheld telephony device. For example, the server may send a control command to the wireless handheld telephony device informing it of an incoming communication. Similarly, the wireless handheld telephony device may send a control command to the server requesting that the current communication be put on hold. These control commands may be sent via the a data channel when such a channel is available.

In some situations, however, a data channel between the wireless handheld telephony device and the server may be permanently or temporarily unavailable. Some current systems use means such as DTMF transmission/detection, data over SMS, USSD, etc. for relaying control or other data when a data channel is unavailable. The use of DTMF protocols and devices for non-audio signalling, however, can be slow, and creates issues concerning both missing tones and false detection of tones and is generally limited.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In one aspect, the present disclosure provides a system for controlling communications between a call control server, a wireless handheld telephony device, and at least one second telephony device, the system comprising a data processor, media readable by the data processor, and a communications system; the communications system adapted to process signals sent between the wireless handheld telephony device, the at least one second telephony device, and the data processor; and the media readable by the data processor comprising coded program instructions adapted to cause the processor to: transmit modulated control signals to the wireless handheld telephony device through the audio channel of a leg of a communication session previously established between the wireless handheld telephony device and at least one second telephony device; and upon receipt of modulated response signals from the wireless handheld telephony device, transmit the modulated response signals to a modem in communication with the call control server.

In another aspect, the present disclosure provides a method enabling a system to transmit signals representing data to and from a wireless handheld telephony device through an audio channel of a first call leg of a communication session previously established between the wireless handheld telephony device and at least one second telephony device, the communication session being controlled by a call control server, the system comprising a data processor, media readable by the data processor and a communications subsystem, the communications subsystem adapted to process signals representing communications by and between the wireless handheld telephony device, the at least one second telephony device, the call control server and the processor and the media readable by the data processor comprising coded program instructions, the method comprising: upon receipt of modulated control signals representing one or more data messages from the call control server, transmitting the modulated control signals to the wireless handheld telephony device through the audio channel of the first call leg; and upon receipt of modulated response signals representing one or more data messages from the wireless handheld telephony device, transmitting the modulated response signals to a modem device in communication with the call control server.

Other aspects of the present disclosure will be apparent to those skilled in the relevant arts from a review of the following detailed description in conjunction with the drawings.

Embodiments of the present application are not limited to any particular operating systems, wireless handheld telephony device architectures, server architectures, or computer programming languages.

Figure 1:
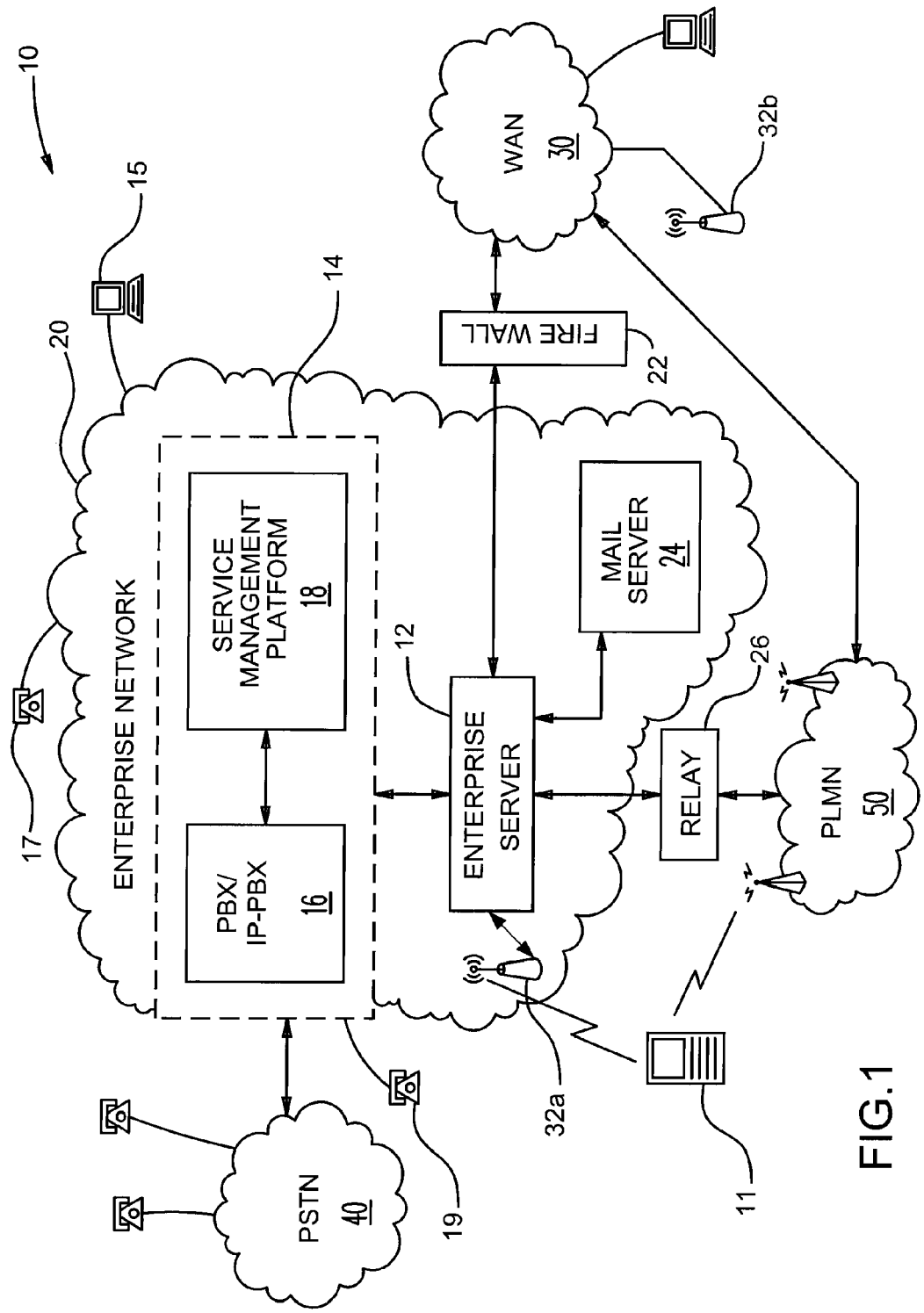
FIG. 1 shows a schematic diagram of an example system suitable for use in managing telephone and other communications in accordance with the disclosure herein.

Reference is now made to FIG. 1, which shows, in block diagram form, an example of a system, generally designated 10, for the control and management of communications, suitable for use in implementing systems and methods disclosed herein. System 10 includes an enterprise or business communications system 20, which may include a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, for example through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. Connection with the PLMN 50 may be made via a relay 26, as known in the art.

The enterprise network 20 may also provide one or more wireless local area networks (WLANs) 32a featuring wireless access points. Other WLANs 32 may exist outside the enterprise network 20. For example, WLAN 32b may be connected to WAN 30.

System 10 may include and/or interact with a number of enterprise-associated mobile devices 11 (only one shown). Mobile device(s) 11 may include devices equipped for cellular communication through the PLMN 50, mobile devices equipped for Wi-Fi communications over one of the WLANs 32, and/or dual-mode devices capable of both cellular and WLAN communications. WLANs 32 may be configured in accordance with one of the IEEE 802.11 specifications.

It will be understood that mobile devices 11 typically include one or more radio transceivers and associated processing hardware and software to enable wireless communications with the PLMN 50 and/or one or more WLANs 32. In various embodiments, PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that a mobile device 11 may roam within the PLMN 50 and across PLMNs, in for example any of a variety of known manners, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

Enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

Relay 26 serves to route messages received over the PLMN 50 from the mobile device 11 to the corresponding enterprise network 20. Relay 26 also pushes messages from the enterprise network 20 to the mobile device 11 via the PLMN 50.

In the embodiment shown, enterprise network 20 also includes an enterprise server 12. Together with the relay 26, the enterprise server 12 can function to redirect, copy, or relay incoming e-mail messages addressed to a user's e-mail address within the enterprise network 20 to the user's mobile device 11 and to relay incoming e-mail messages composed and sent via the mobile device 11 out to the intended recipients within the WAN 30 and/or elsewhere. Among other functions, enterprise server 12 and relay 26 together can facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, an enterprise network 20 can include one or more Private Branch eXchanges (although in various embodiments the PBX(s) may include standard PBX(s) or IP-PBX(s), for simplicity the description below uses the term PBX to refer to both) 16 having a connection with the PSTN 40 for routing incoming and outgoing voice calls to and from digital and/or analog telephones or other telephony devices for the enterprise. PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some embodiments, PBX 16 may be connected to one or more conventional analog telephones 19. The PBX 16 may also be connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

Enterprise network 20 may include a Service Management Platform (SMP) 18 for performing aspects of messaging or session control, such as call control and advanced call processing features. SMP 18 may, in some cases, also perform some media handling. Collectively SMP 18 and PBX 16 may be referred to as a enterprise communications platform, generally designated 14. It will be appreciated that an enterprise communications platform 14 and, in particular, an SMP 18, can be implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

For devices such as telephony devices 11, 19 controlled by or otherwise associated with it, enterprise communications platform 14 can implement switching to connect session legs and may provide conversion between, for example, a circuit-switched call and a VoIP call, or connect legs of other media sessions. Such calls/sessions may be set up and modified on behalf of devices 11, 19 and any desired telephony devices, within or outside enterprise network 20, including for example devices 19, 107 connected to PSTN 40. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

Among capabilities of enterprise communications platform 14 may be the ability to extend the features of enterprise telephony to mobile device(s) 11. For example, an enterprise communications platform 14 may allow mobile device(s) 11 to perform functions akin to those normally available on a standard office telephone, such as the digital telephone set 17 or analog telephone set 15. Example features may include direct extension dialing, enterprise voice mail, conferencing, call transfer, call park, etc. As further described elsewhere herein, enterprise communications platform 14 may be configured to provide functions such as transfer of corresponding ends of existing communications sessions from one or more mobile devices 11 to wired telephony devices 19 associated with platform 14.

Figure 2:
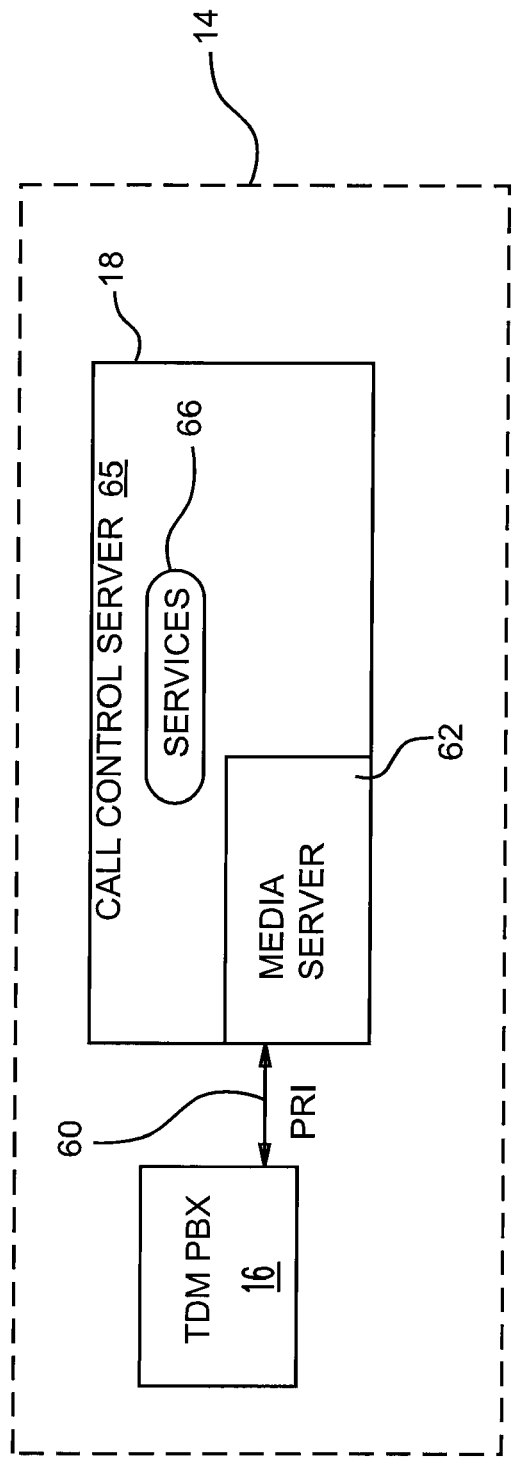
FIGS. 2-4 show schematic diagrams of examples of embodiments of details of a system such as that shown in FIG. 1.
Figure 3:
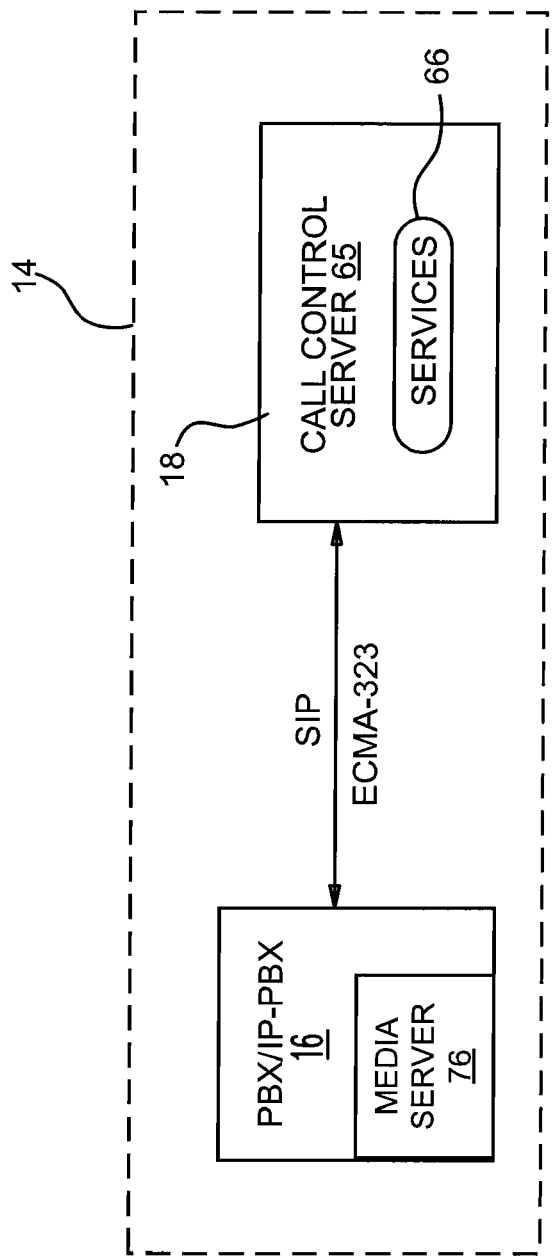
Figure 4:
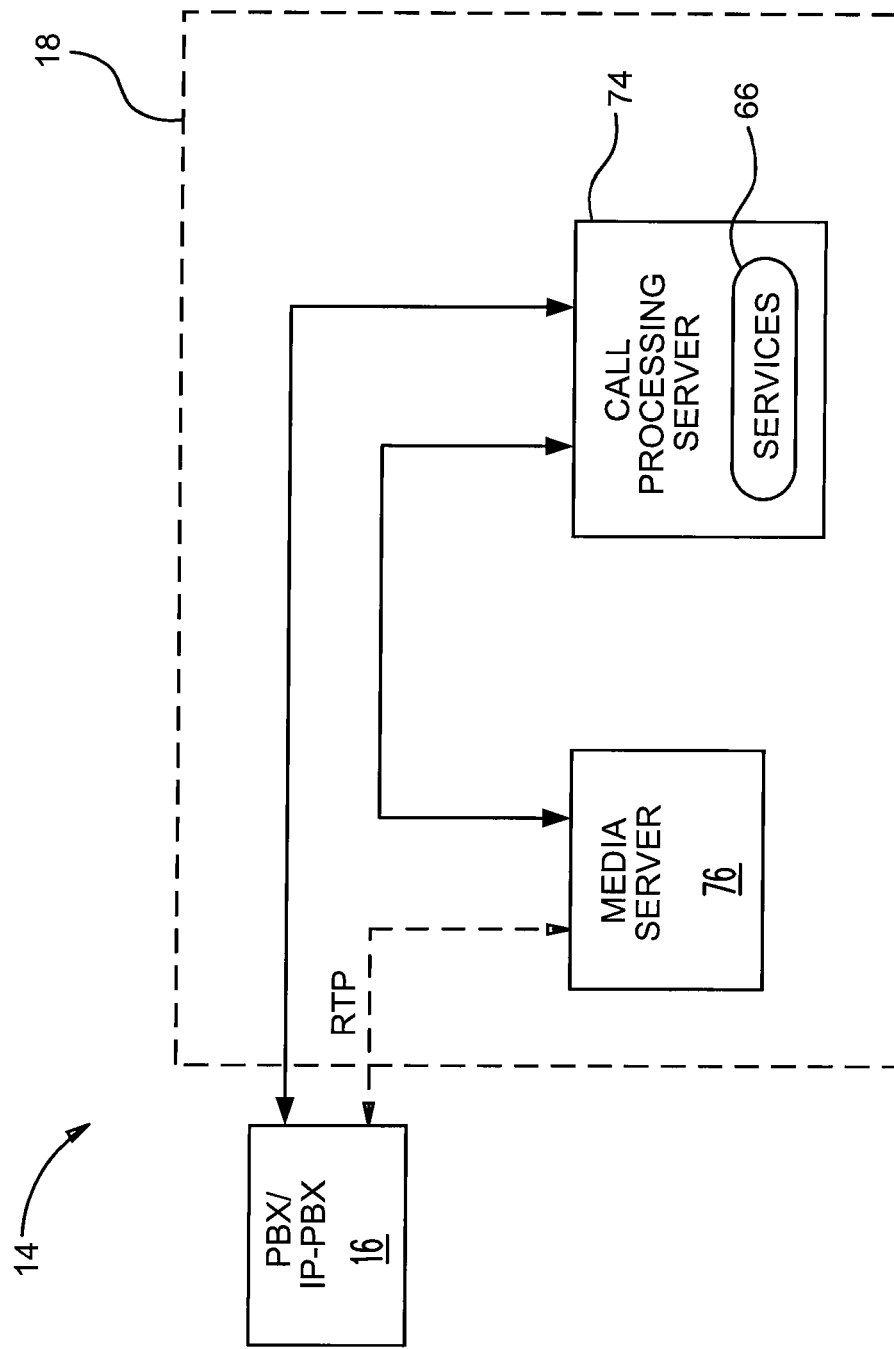

Reference is now made to FIGS. 2 to 4, which show example embodiments of the enterprise communications system 14. Although references are made below to "calls" or call-centric features it will be appreciated that the architectures and systems depicted and described are applicable to session-based (e.g., voice) communications in general and, in some instances, to text, image, or other messaging-based communications.

FIG. 2 illustrates an embodiment intended for use in a circuit-switched TDM context. The PBX 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In such embodiments, an SMP 18 can assume control over both call processing and the media itself. This architecture may be referred to as "First Party Call Control". Many of the media handling functions normally implemented by the PBX 16 may be handled by the SMP 18 in this type architecture. Incoming calls addressed to any extension or direct dial number within the enterprise, for example, may first be routed to the SMP 18. Thereafter, a call leg may be established from the SMP 18 to the called party within the enterprise, and the two legs may be bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

SMP 18 may implement various scripts 66 for managing call processing. The scripts 66 may be implemented as software modules, routines, functions, etc., stored in non-volatile memory and executed by the processor of the SMP 18. Such scripts 66 may implement call flow logic, business logic, user preferences, call service processes, and various feature applications.

FIG. 3 shows another embodiment in which the PBX 16 performs the functions of terminating and/or bridging media streams, but call control functions are largely handled by the SMP 18. In this embodiment, the SMP 18 may be referred to as a call control server 18. Such an architecture may be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 may employ a communications protocol conforming to the ECMA-269 or ECMA-323 standards for Computer Supported Telecommunications Applications (CSTA).

FIG. 4 shows yet another embodiment of an enterprise communications system 14. This embodiment reflects the adaptation of an existing set of call processing scripts to an architecture that relies on third-party call control, with separate call control and media handling. In this embodiment SMP 18 includes a call processing server 74. The call processing server 74 implements the scripts or other programming constructs for performing call handling functions. SMP 18 can also include an SIP server 72 and a media server 76. The separate SIP server 72 and media server 76 logically separate call control from media handling functions. SIP server 72 can interact with call processing server 74 using a computer-implemented communications handling protocol, such as one of the ECMA-269 or ECMA-323 standards. These standards prescribe XML-based messaging for implementing Computer Supported Telecommunications Applications (CSTA).

SIP server 72 can interact with media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP).

It will be appreciated by those skilled in the relevant arts that a wide variety of architectures or configurations for the enterprise communications system 14 are suitable for use in implementing the systems and methods disclosed herein.

Figure 5:
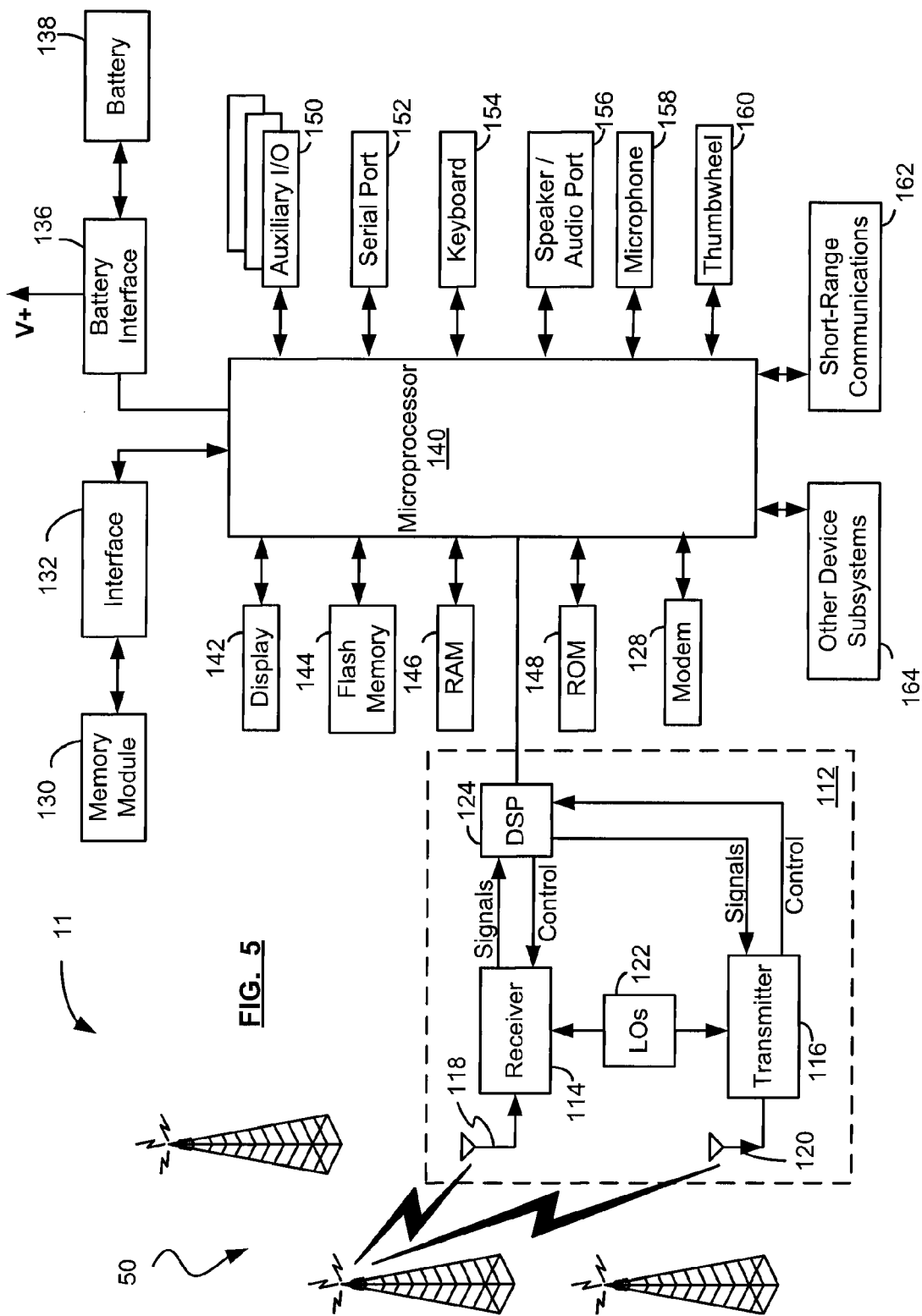
FIG. 5 shows a schematic block diagram of a wireless handheld telephony device 11 suitable for use in conjunction with the system of FIG. 1.

Reference is now made to FIG. 5, which shows a schematic block diagram of a wireless handheld telephony device 11 suitable for use in conjunction with the system 10 described above in relation to FIG. 1.

In various embodiments, wireless handheld telephony device 11 is a two-way mobile communication device having at least voice and data communication capabilities, including the capability to communicate with other computer systems. Depending on the functionality(ies) provided by the wireless handheld telephony device 11, it may be referred to as a data messaging device, a two-way pager, a cellular telephone with data messaging capabilities, a wireless Internet appliance, a data communication device (with or without telephony capabilities), a clamshell device, or a flip-phone. The wireless handheld telephony device 11 may communicate with any one of a plurality of fixed transceiver stations within its geographic coverage area.

The wireless handheld telephony device 11 may incorporate a communication subsystem 112, which can include a receiver 114, transmitter 116, and associated components, such as one or more antenna elements 118 and 120, local oscillators (LOs) 122, and one or more processing modules such as a digital signal processor (DSP) 124. In various embodiments, antenna elements 118 and 120 may be embedded or internal to the wireless handheld telephony device 11. As will be apparent to those skilled in the relevant arts, the particular design of the communication subsystem 112 will depend, in part, on the system(s), such as enterprise network 20, the PLMN 50 and/or the WLANs 32, with which the wireless handheld telephony device 11 is intended to communicate.

The wireless handheld telephony device 11 may send and receive communication signals to and from, for example, an enterprise server 20 through, for example, the PLMN 50 and/or one of the WLANs 32. Signals received by the antenna 118 may be input to the receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by the DSP 124. Such DSP-processed signals may be input to the transmitter 116 for digital-to-analog (D/A) conversion, frequency up conversion, filtering, amplification, and transmission via the antenna 120. The DSP 124 not only processes communication signals, but also provides for receiver and transmitter control. For example, gains applied to communication signals in the receiver 114 and the transmitter 116 may be adaptively controlled through automatic gain control algorithms implemented in or by the DSP 124.

Network access may be associated with a subscriber or user of the wireless handheld telephony device 11 via a memory module, such as a memory module 130, which may include a Subscriber Identity Module (SIM) card for use in a GSM network or a Universal Subscriber Identity Module (USIM) card for use in a Universal Mobile Telecommunication System (UMTS). Such a SIM card may be inserted in or connected to an interface 132 of the wireless handheld telephony device 11. Alternatively, or in addition, the wireless handheld telephony device 11 may have an integrated identity module for use with systems such as Code Division Multiple Access (CDMA) systems.

The wireless handheld telephony device 11 may also include a battery interface 136 for receiving one or more rechargeable batteries 138. The battery 138 provides electrical power to at least some of the electrical circuitry in the wireless handheld telephony device 11, and the battery interface 136 provides a mechanical and electrical connection for the battery 138. The battery interface 136 is coupled to a regulator (not shown) which provides power V+ to the circuitry of the wireless handheld telephony device 11.

Wireless handheld telephony device 11 can include one or more microprocessors 140 for control of the overall operation of the wireless handheld telephony device 11. for example, under control of mircroprocessor(s) 140 communication functions, including at least data and voice communications, may performed through the communication subsystem 112. Microprocessor(s) 140 may also interact with additional device subsystems such as modem 128, primary display 142, optional secondary display 143, flash memory 144, random access memory (RAM) 146, read-only memory (ROM) 148, auxiliary input/output (I/O) subsystems 150, data port(s) such as Universal Serial Bus (USB) port 152, keyboard or keypad 154, speaker or audio port(s) 156 for connecting to, for example a set of headphones or an earpiece, microphone 158, clickable thumbwheel or thumbwheel 160, open/close sensor 161, short-range communications subsystem 162, and any other device subsystem(s) generally designated as 164. Some of the subsystems shown in FIG. 5 perform communication-related functions, whereas other subsystems may provide "resident" or on-device functions. Notably, some subsystems, such as the keypad 154, the primary display 142, the secondary display 143, and the clickable thumbwheel 160, for example, may be used for both communication-related functions, such as displaying notifications or entering a text message for transmission through, for example, the PLMN 50 and/or one of the WLANs 32, and executing device-resident functions such as a clock, a calculator or a task list. Operating system software used by the microprocessor 140 is preferably stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

Microprocessor 140, in addition to its operating system functions, may enable execution of software applications on the wireless handheld telephony device 11. A predetermined set of applications that control basic device operations, including data and voice communication applications, will normally be installed on the wireless handheld telephony device 11 during or after manufacture. The wireless handheld telephony device 11 may include a personal information manager (PIM) application having the ability to organize and manage data items relating to a user such as, but not limited to, instant messaging, email, calendar events, voice mails, appointments, and task items. One or more memory stores may be available on the wireless handheld telephony device 11 to facilitate storage of information, such as the flash memory 144, the RAM 146, the ROM 148, the memory module 130, or other types of memory storage devices or FLASH memory cards represented by the other device subsystems 164, such as Secure Digital (SD) cards or mini SD cards, etc.

PIM and/or media applications may have the ability to implement sending and receiving of data items via PLMN 50 and/or one of the WLANs 32 or via a link to a computer system. Suitable communications links to involved computer systems may be established via a serial port 152 and/or a short-range communications subsystem 162. In some embodiments, PIM and/or media data items are seamlessly combined, synchronized, and updated, for example, through the PLMN 50 and/or one of the WLANs 32, with the wireless handheld telephony device user's corresponding data items stored and/or associated with a host computer system thereby creating a mirrored or partially mirrored host computer on the wireless handheld telephony device 11 with respect to such items. This may be advantageous where, for example the host computer system is the wireless handheld telephony device user's office computer system. Additional applications may also be loaded onto the wireless handheld telephony device 11 through, for example, the PLMN 50 and/or one of the WLANs 32, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation increases the functionality of the wireless handheld telephony device 11 and may provide enhanced on-device functions, communication-related functions, or both. For example, secure communication applications may enable electronic commerce functions and other such financial transactions to be performed using the wireless handheld telephony device 11.

In a data communication mode, a received data signal representing information such as a text message, an email message, a media file to be transferred, or Web page download can be processed by the communication subsystem 112 and input to the microprocessor 140. The microprocessor 140 can further process the signal for output to the primary display 142, secondary display 143, or alternatively to the auxiliary I/O device 150. A user of the wireless handheld telephony device 11 may also compose data items, such as email messages, for example, using the keypad 154 and/or the clickable thumbwheel 160 in conjunction with the primary display 142 and possibly the auxiliary I/O device 150. The keypad 154 maybe either a complete alphanumeric keypad or telephone-type keypad. These composed items may be transmitted through the communication subsystem 112 or via the short range communication subsystem 162.

For voice communications, the overall operation of the wireless handheld telephony device 11 is similar, except that the received signals may be output to the speaker or audio port 156 and signals for transmission can be generated by a transducer such as the microphone 158. Alternative voice or audio I/O subsystems, such as a voice message recording subsystem, may also be implemented on the wireless handheld telephony device 11. Although voice or audio signal output is typically accomplished primarily through the speaker or audio port 156, the primary display 142 or the secondary display 143 may also be used to provide an indication of the identity of a calling party or the communication type, duration of a voice call, or other voice call related information. Stereo headphones or an earpiece may also be used in place of the speaker 156.

USB port 152 is normally implemented in a personal digital assistant (PDA) type communication device for which synchronization with a user's computer is a desirable, albeit optional, component. USB port 152 can enable a user to set preferences through an external device or software application and can extend the capabilities of the wireless handheld telephony device 11 by providing for information or software downloads to the wireless handheld telephony device 11 other than through the PLMN 50 and/or one of the WLANs 32. The alternate download path may, for example, be used to load software or data files onto the wireless handheld telephony device 11 through a direct, reliable and trusted connection.

Short-range communications subsystem 162 is an additional optional component which can provide for communication between the wireless handheld telephony device 11 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In further embodiments, the short-range communications subsystem 162 may include a wireless networking communications subsystem, conforming for example to IEEE 802.11 standards such as one or more of 802.11b, 802.11g, and/or 802.11n.

Modem device 128 may, for example, comprise a low-bandwidth modem which can modulate and demodulate data signals to be transmitted over a voice channel. For example, the modem could be a high speed, low-bandwidth modem such as, for example, the 3GPP modem (TS 26.267 or TS 26.268). The modem may also comprise a coder/decoder (also referred to as a codec).

Figure 6:
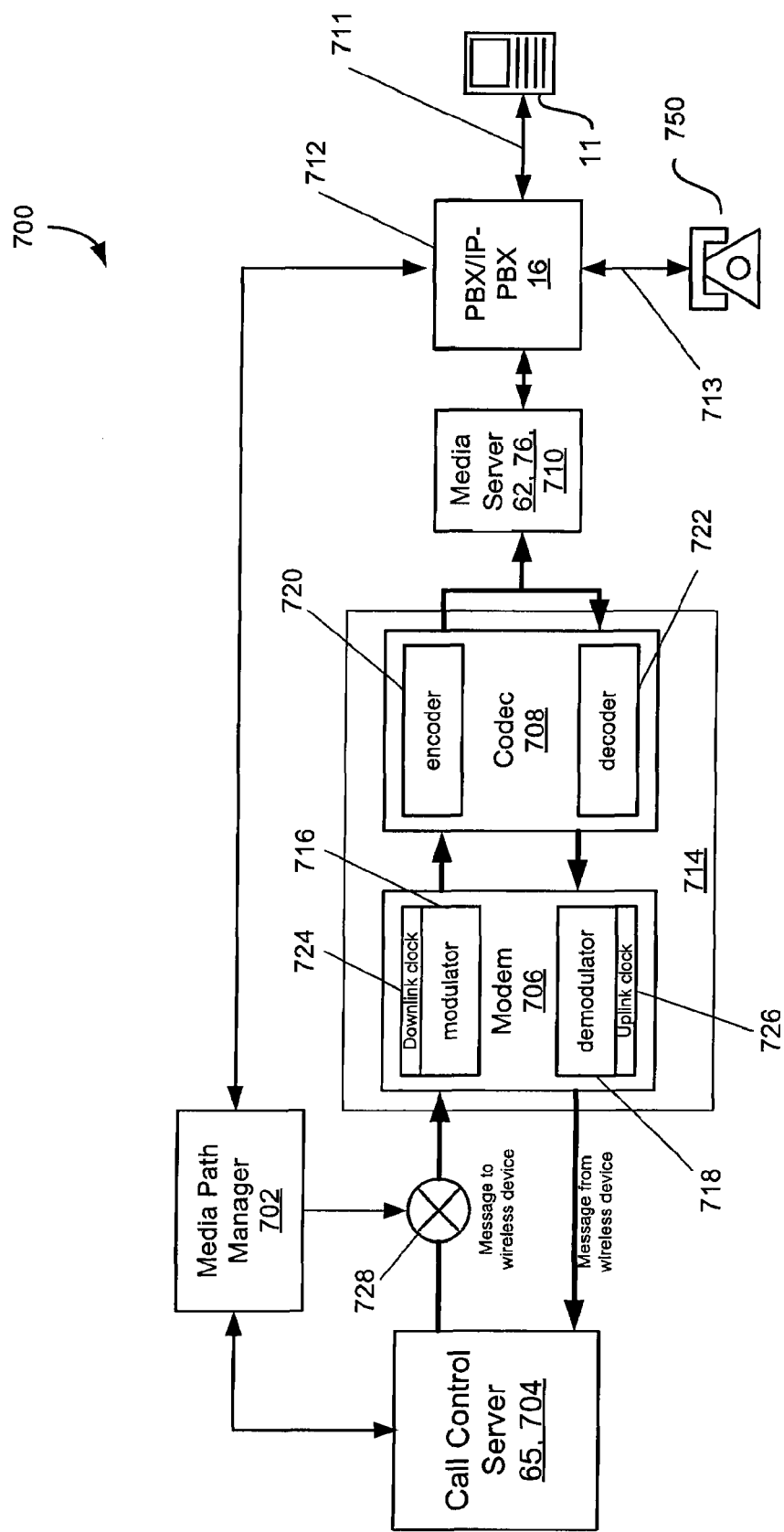
FIG. 6 shows a schematic diagram of an example of a system suitable for use in managing telephone and other communications in accordance with the disclosure herein.

Reference is now made to FIG. 6 which shows, in schematic block diagram form, an example of a system 700 suitable for transmitting data to a wireless handheld telephony device 11 in accordance with this disclosure. In the example shown, system 700 comprises, or is configured to operate in conjunction with, a wireless handheld telephony device 11 which may for example be engaged in an ongoing or otherwise previously-established communication session with one or more second telephony device(s) 750 through a gateway 712. Second telephony device(s) 750 may include telephony device(s) such as, for example, digital telephony device(s) 19, analogue telephony device(s) 17, and/or other wireless handheld telephony device(s) 11. Second telephony device(s) 750 may include any telephony device(s), wireline or wireless, suitable for use in cojunction with the systems and methods disclosed herein.

Gateway 712 facilitates communication between the wireless handheld telephony device 11 and one or more second telephony device(s) 750. Gateway 712 may include or comprise component(s) such as, for example, a PBX 16 as well as a communication network such as PSTM 40 or PLMN 50 of FIG. 1. Gateway 712 may, for example, be incorporated as a part of an enterprise system, or may be hosted by a wireline or wireless carrier.

A communication session between the wireless handheld telephony device 11 and the second telephony device(s) 750 may include two call legs: a first call leg 711 between the wireless handheld telephony device 11 and the gateway 712, and a second call leg 713 between the gateway 712 and each of second telephony device(s) 750. Each call leg may comprise at least an audio stream to and from the gateway 712, and optionally one or more control signal streams. The gateway 712 may anchor each call leg at a location that is controllable by the call control server 704, and may transfer or otherwise direct voice and other data signals from one call leg to another call leg. This may be performed, for example, using Session Description Protocol (SDP, RFC 2327) Shuffling.

In some embodiments, a call control server 704 may be employed to facilitate and control the communication session between the two call legs. For example, when an internal call is made from a corporate desk phone (illustrated here as second telephony device 750) to an employee's cellular phone 11, the corporate desk phone 750 may dial only the internal extension of the cell phone user. The call control server may convert the internal number to an external cellular phone number or use outside an enterprise environment.

A call control server 704 may manipulate call legs via a media path manager 702. For example, the media path manager 702 may be used to request that pairs or other sets of call legs be joined together in order to connect an end-to-end call. Call control server 704 and media path manager 702 may, for example, form part of an SMP 18 of FIG. 1. Functions of a call control server 702 may be provided by, for example, various components of an enterprise communications platform 14 shown in FIG. 1 and described above.

For many cellular technologies, such as CDMA 1x, EVDO, GSM, GPRS/EDGE, etc., once a voice communication is established, maintenance of a data channel between the call control server 704 and the wireless handheld telephony device 11 is commonly discontinued. Without a data channel, messages such as control messages to be transmitted to and from a wireless handheld telephony device 11, such as, for example, in-call feature execution instructions (e.g., hold, dial new number for conference, call waiting, etc.), must be transmitted by some other means such as via an audio channel in use for transmission of call content signals. The system 700 may use a modem device 714 to provide communication between the call control server 704 and the wireless handheld telephony device 11 using the audio channel. The use of a modem to send data via an audio channel may introduce noise to the ongoing communication for short periods of time (e.g. tenths of a second). In contrast, it can take three to four seconds to pass a ten digit number using DTMF tones.

A media server 710 may connect a modem device 714 to a gateway 712 by, for example, constructing a third call leg. In some embodiments, the modem device 714 may be implemented as a function on the media server 710.

A modem device 714 can comprise a modem 706, such as a low-bandwidth duplex modem, and optionally a coder/decoder (also referred to as a codec) 708. Codec 708 may for example comprise an encoder 720 for encoding an outgoing signal into a format that is acceptable for processing by, for example, media server 710 (such as, for example, AMR, G.711, G.729, G.722, etc.) and a decoder 722 for decoding incoming signals.

The modem 706 may comprise a modulator 716 and a demodulator 718. Modem 706 may be a high speed (e.g. >400 B/s) low bandwidth voice modem, which may be designed to provide reliable delivery on compressed voice/wireless audio channels. In some embodiments, a modem 706 may use two different clocks, an uplink clock 726 for the uplink data path and a downlink clock 724 for the downlink data path, which may help ensure that signalling in both directions can occur simultaneously. For example, the clocks 724, 726 may be used to ensure that the modulation is performed at different frequencies for the uplink and downlink, thus providing duplex communications.

Modulated signals transmitted from the wireless handheld telephony device along the first call leg may be received by gateway 712 and passed to modem device 714 through the media server 710. Such modulated signals may then be decoded by the decoder 722 of the codec 708, passed through the demodulator 718 of the modem 706 and delivered to the call control server 704. Similarly, signals transmitted from the call control server 704 may be passed through the modulator 716 of the modem 706, encoded by the encoder 720 of the codec 708, passed to the media server 710 and transmitted to the wireless handheld telephony device 11 by the gateway 712 along the first call leg. Data messages are sent when a path is available, for example, when where the first call leg is appropriately connected to the modem device 714. On the downlink, that is, the path from the call control server 704 to the wireless handheld telephony device 11, to ensure data messages are sent when a path is available, the media path manager 702 may operate a gate 728 that is open when the path is available. In some embodiments, if a message to be sent from the wireless handheld telephony device 11 is in response to a message from the call control server 704 (e.g. a synchronous command), a path may be available. Alternatively or where a command from the wireless handheld telephony device 11 is asynchronous (e.g. not sent in response to a command from the call control server 704), a request, such as a DTMF-coded instruction signal, may be sent by the wireless handheld telephony device 11 before a data message is sent as explained below.

A modem device 128 of the wireless handheld telephony device 11 (e.g., see FIG. 5) may comprise a similar codec and modem, thus allowing the decoding/demodulation of control messages to the wireless handheld telephony device 11 and the encoding/modulation of response messages from the wireless handheld telephony device 11.

Among other services, a media server 710 may provide conferencing capabilities. In some embodiments, for example, a conference bridge may be established for each communication between a wireless handheld telephony device 11 and a second telephony device 750, such that a third call leg is established between the gateway 712 and the modem device 714. In such embodiments, data messages may be sent and received between the call control server 704 and the wireless handheld telephony device 11 through the modem device 714 at any time.

In other embodiments, a conference bridge may be established by the media server 710 when data is to be transmitted between the wireless handheld telephony device 11 and the call control server 704. In such embodiments, if a message is to be transmitted from the call control server 704 to the wireless handheld telephony device 704, the media path manager 702 may send a request to the media server 710 to establish a conference bridge. Once the message has been transmitted through the modem device 714, the media server 710 may disable the conference bridge. If a message is to be transmitted from the wireless handheld telephony device 11 to the call control server 704, an instruction signal, such as one or more suitably-configured DTMF tone(s), may be sent from the wireless handheld telephony device 11. This signal may for example indicate to the media server 710 that a conference bridge is requested. Once a conference bridge has been established, the wireless handheld telephony device 11 may transmit any desired modulated signals representing messages to be transmitted to the call control server 704 via the modem device 714. Once such modulated signals have been sent, the media server 710 may disable the conference bridge.

In further embodiments, data may be transmitted by temporarily swapping communications to a third call leg. In such embodiments, when a data message is to be transmitted between the wireless handheld telephony device 11 and the call control server 704, the second call leg between the gateway 712 and the second telephony device 750 may be temporarily disconnected or otherwise suspended by the gateway 712, and a third call leg between the gateway 712 and the modem device 714 may be temporarily established. Once the data has been transmitted, the third call leg may be disconnected and the second call leg between the wireless handheld telephony device 11 and the second telephony device 750 may be re-established. This may require a break in the communication between the wireless handheld telephony device 11 and the second telephony device 750 of, for example, a few hundred milliseconds. As no conferencing is required in such embodiments, the media server 710 may not be required.

Figure 7:
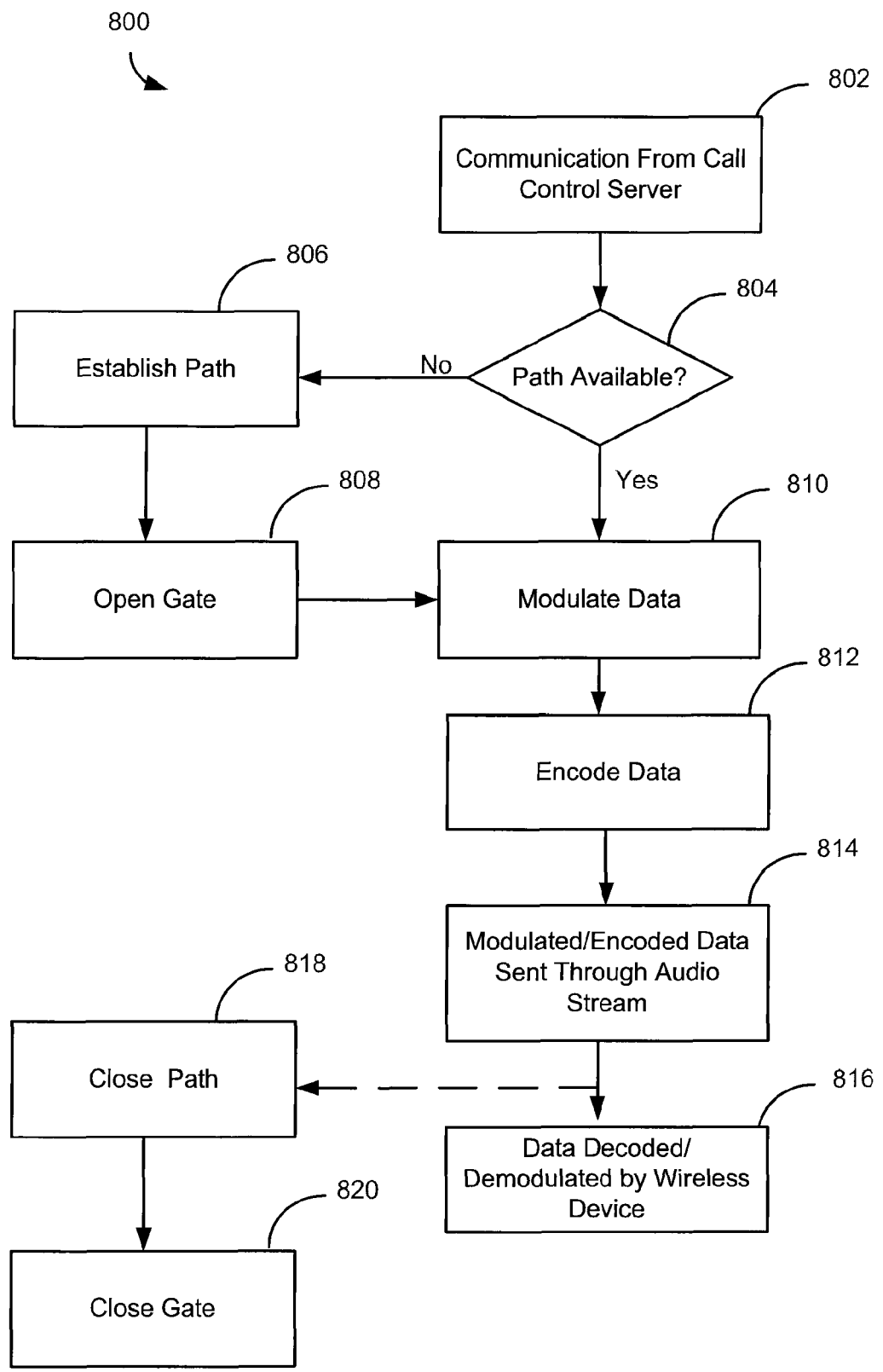
FIG. 7 shows a schematic flow diagram of an example of a method of transmitting a data message from a call control server to a wireless handheld telephony device suitable for use in implementing various embodiments of the disclosure.

Reference is next made to FIG. 7, which shows a flow diagram representing an example of a method 800 for transmitting data from a processor such as a call control server 704 to a wireless handheld telephony device 11 engaged in an ongoing communication session with a second telephony device 750. Embodiments of method 800 are suitable for use, for example, in conjunction with systems 10, 700 of FIGS. 1 and/or 6 and wireless handheld telephony device(s) 11 of FIG. 5 in implementing aspects of the disclosure herein.

A method 800 can be considered to begin at block 802 where a call control server 704 has a message in the form of signals representing data to be transmitted to a wireless handheld telephony device 11 while the wireless handheld telephony device 11 is engaged in an ongoing communication with a second telephony device 750, for example through a gateway 712. For example, the call control server 704 may wish to send a message to the wireless handheld telephony device 11 when a second incoming call for the wireless handheld telephony device 11 is received. In some situations, no data connection exists between the call control server 704 and the wireless handheld telephony device 11. As explained herein, the data may instead be sent in-band via the audio channel using modulated data signals.

At 804, it may be determined whether or not a path is available between the modem device 714 and the gateway 712.

If a path is available at 804, the method 800 proceeds to 810 where the data is modulated. As explained above, there are a number of different ways in which the transmission of data between the call control server 704 and the wireless handheld telephony device 11 may be facilitated. For example, in some embodiments, a conference bridge may be established by, for example, a media server 710, for each communication involving the wireless handheld telephony device 11. In other words, a third call leg may be established to the modem device 714 from the gateway 712. In such embodiments, a path will be available at 804 and the method 800 continues from block 804 to block 810. In other embodiments, a path will always be available at 804 and the method 800 always always continues from block 804 to block 810.

If, however, a path is determined not to be available at 804, at 806 a suitable path is established. For example, in some embodiments, a temporary conference bridge may be established by, for example, a media server 710, when a message is to be sent between the call control server 704 and the wireless handheld telephony device 11. In such embodiments, a path may not be available at 804 and may need to be established at 806. Where the message originates from the call control server 704, the call control server 704 may notify the media path manager 702 to send a request to the media server 710 to establish a conference bridge. Once the conference bridge is established, creating a path between the modem device 714 and the gateway 712, the media server 710 may send a notification back to the media path manager 702 that the path is available.

In other embodiments, a path may be established between the modem device 714 and the wireless handheld telephony device 11 by creating a temporary call leg between the modem device 714 and the gateway 712 and temporarily disconnecting or otherwise suspending the second call leg from the gateway 712 to the second telephony device 750. In such embodiments, a path may not be available at 804 and may need to be established at 806. Where the message originates from the call control server 704, the call control server 704 may notify the media path manager 702 to send a request to media server 710 through the gateway 712 to establish the third call leg. Once the third call leg is established to the modem device 714 and the second call leg to the second telephony device 750 is temporarily suspended, the gateway 712 may send a notification to the media path manager 702 that the path is available.

Once a path is established at 806, a gate 728 may be opened by the media path manager 702 at 808, allowing data to flow from the call control server 704 to the modem 706. Once the gate has been opened at 808, the method 800 proceeds to block 810.

At 810, data from the call control manager 704 may be modulated by a modem 706 into signals which may be transmitted via an audio stream. At 812, the modulated data may be encoded by an encoder 720 into an appropriate format (such as, for example, AMR, G.711, G.729, G.722, etc.).

At 814 modulated/encoded data may be sent to the gateway 712 to be transmitted to the wireless handheld telephony device through the voice connection between the gateway 712 and the wireless handheld telephony device 11. The data may then by decoded (if necessary) and demodulated by a modem device 128 associated with the wireless handheld telephony device 11 at 816.

In some embodiments, a path between modem device 714 and gateway 712 may need to be closed at 818 once data has been sent to the wireless handheld telephony device 11. For example, where a temporary conference bridge has been established in order to facilitate the communication, this conference bridge may be disabled by, for example, the media server 710, once the message has reached the gateway 712. In other embodiments, where a temporary call leg has been established to the modem device 714, as explained above, the temporary call leg may be disabled and the second call leg to the second telephony device 750 may be re-established at 818. In either case, at 820, the gate 728 may be closed in order to prevent data from being sent from the call control server 704 until a new path is established. In some embodiments, where a response is expected from the wireless handheld telephony device 11, the path may remain open until the response is received.

Figure 8:
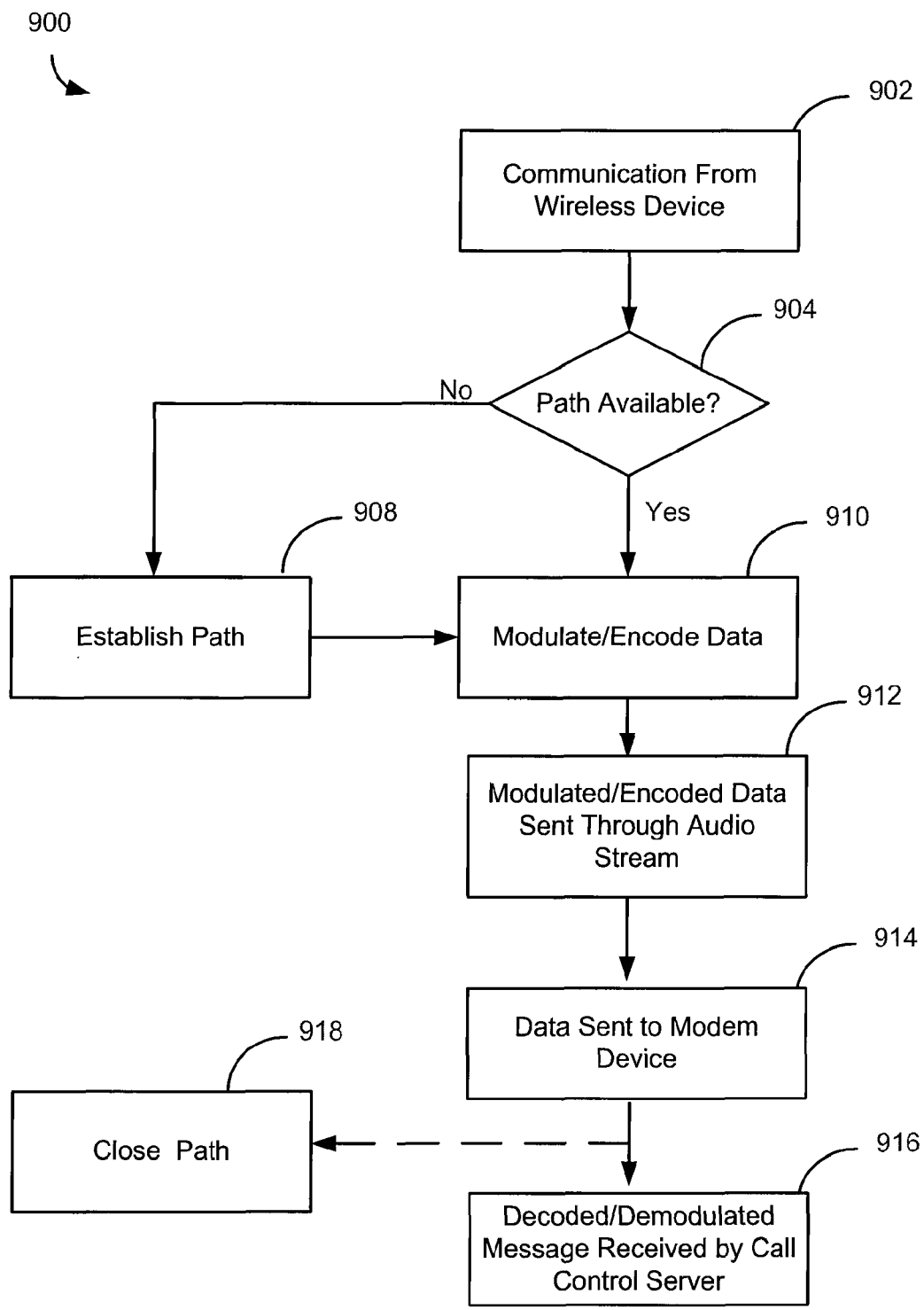
FIG. 8 shows a schematic flow diagram of an example of a method of transmitting a data message from a wireless handheld telephony device to a call control server according to an embodiment.

Reference is next made to FIG. 8, which shows a flow diagram representing an example of a method 900 for transmitting data from a wireless handheld telephony device 11 to a call control server 704 where the wireless handheld telephony device 11 is engaged in an ongoing communication with a second telephony device 750. Method 900 is suitable for use, for example, in conjunction with systems 10, 700 of FIGS. 1 and/or 6 and wireless handheld telephony device 11 of FIG. 5 in implementing the disclosure herein.

A method 900 can be considered to begin at block 902 where a wireless handheld telephony device 11 has a message in the form of signals representing data to be transmitted to a call control server 704 and the wireless handheld telephony device 11 is engaged in an ongoing communication with a second telephony device 750 through a gateway 712. For example, where the wireless handheld telephony device 11 has been informed that a second incoming communication is pending, the wireless handheld telephony device 11 may wish to send a suitably-configured instruction signal to the call control server 704 as to whether the second incoming communication should be accepted or rejected. As explained above, in some situations, no data connection exists between the call control server 704 and the wireless handheld telephony device 11. As explained herein, data may instead be sent in-band via the audio channel using modulated data signals.

At 904, it is determined whether or not a path is available between the modem device 714 and the wireless handheld telephony device 11.

If a path is available at 904, the method 900 proceeds to 910 where the data is modulated/encoded. Again, as explained above, there are a number of different ways in which the transmission of data between the call control server 704 and the wireless handheld telephony device 11 may be facilitated. For example, in some embodiments, a conference bridge may be established by, for example, a media server 710, for each communication involving the wireless handheld telephony device 11. In other words, a third call leg may be established to the modem device 714 from the gateway 712. In such embodiments, a path will always be available at 904 and the method 900 always continues from block 904 to block 910.

A path may also be available at 904 in other situations, such as when the media server 710 leaves the path open in anticipation of a response from the wireless handheld telephony device 11.

If, however, a path is determined not to be available at 904, the method 800 proceeds to block 806 where a path is established. For example, in some embodiments, a temporary conference bridge may be established by, for example, a media server 710, when a message is to be sent between the call control server 704 and the wireless handheld telephony device 11. In such embodiments, a path may not be available at 904 and may need to be established at 906. Where the message originates from the wireless handheld telephony device 11, the wireless handheld telephony device 11 may need to notify the media server 710 that a message is forthcoming. This may be done, for example, by sending an initiating signal to the gateway 712 which may in turn notify the media server 710 that a conference bridge is required. The initiating signal may, for example, be in the form of a tone, such as a DTMF tone. Once the conference bridge is established, creating a path between the modem device 714 and the gateway 712, the media server 710 may send a notification back to the gateway which may in turn notify the wireless handheld telephony device 11 that a path is available.

In further embodiments, a path may be established between the modem device 714 and the gateway 712 by creating a temporary call leg between the modem device 714 and the gateway 712 and temporarily suspending or holding the call leg from the gateway 712 to the second telephony device 750. In such embodiments, a path may not be available at 904 and may need to be established at 906. Where the message originates from the wireless handheld telephony device 11, the wireless handheld telephony device 11 may send a signal to the media server 710 through the gateway 712 to establish the third call leg. The signal may, for example, be in the form of a tone such as a DTMF tone. Once the third call leg is established to the modem device 714 and the second call leg to the second telephony device 750 is temporarily suspended, the gateway 712 may send a notification back to the wireless handheld telephony device 11 that the path is available.

At 910, the message data may be modulated and/or encoded into signals which may be transmitted via an audio stream by a modem device 128 associated with the wireless handheld telephony device 11.

At 912, the modulated/encoded signals may be sent to the gateway 712 through the first call leg between the gateway 712 and the wireless handheld telephony device 11. At 914, the modulated/encoded signals may be sent to the modem device 714. The data may be decoded (if necessary) by codec 708 and demodulated by the demodulator 718. At 916, the data message may be received by the call control server 704.

In some embodiments, a path between the modem device 714 and the gateway 712 may need to be closed or disabled, at 918, once signals have been sent to the modem device 714. For example, where a temporary conference bridge has been established in order to facilitate the transmittance, this conference bridge may be disabled by, for example, the media server 710. In other embodiments, where a temporary call leg has been established to the modem device 714, as explained above, the temporary call leg may be disabled and the second call leg to the second telephony device 750 may be re-established or unsuspended at 918.

While the steps of methods 800 and 900 are shown as occurring in a particular order, it will be appreciated by those skilled in the relevant arts that many of the process steps, and portions thereof, are interchangeable and may occur in different orders that that shown without materially affecting the end results of the methods 800 and 900. It will further be appreciated by such persons that not all of such steps are required in order to accomplish the purposes disclosed herein, and that further steps may be optionally implemented.

While the disclosure has been provided in connection with specific, presently-preferred embodiments, many variations and modifications may be made without departing from the spirit and scope of the invention. The disclosure is therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the claims is to be defined solely by the appended claims, giving due consideration to the doctrine of equivalents and related doctrines.

What is claimed is:

1. A method enabling a system to transmit signals representing data to and from a wireless handheld telephony device through an audio channel of a communication session previously established between the wireless handheld telephony device and at least one second telephony device, the system comprising a gateway having a data processor, media readable by the data processor and a communications subsystem, the communications subsystem adapted to process signals representing communications by and between the wireless handheld telephony device, the at least one second telephony device and a call control server via the gateway, the communication session being controlled by the call control server, the communication session having a first call leg between the wireless handheld telephony device and the gateway and at least a second call leg between the at least one second telephony device and the gateway, and the media readable by the data processor comprising coded program instructions to cause the data processor to carry out the method, the method comprising:

upon receipt of modulated control signals representing one or more data messages from the call control server, temporarily establishing a third call leg between the gateway and a modem device in communication with the call control server;

receiving, at the gateway, the modulated control signals from the call control server via the established third call leg with the modem device;

transmitting the modulated control signals to the wireless handheld telephony device through the audio channel of the first call leg;

upon receipt of modulated response signals representing one or more data messages from the wireless handheld telephony device, transmitting the modulated response signals to the modem device via the established third call leg; and when the modulated control signals have been sent and the modulated response signals have been received, disconnecting the third call leg.

2. The method of claim 1, wherein the modem device is configured to modulate signals received from the call control server and to demodulate signals received from the wireless handheld telephony device.

3. The method of claim 1, wherein the third call leg is established by a media server using a conference bridge.

4. The method of claim 1, wherein each call leg between the gateway and each of the wireless handheld telephony device and the one or more second telephony devices is established by a media server using a conference bridge.

5. The method of claim 3, wherein the conference bridge is established when the one or more signals are to be sent and the conference bridge is disabled after the one or more signals have been sent.

6. The method of claim 5, wherein the conference bridge is established upon receiving an instruction signal from one of the call control server and the wireless handheld telephony device.

7. The method of claim 1, further comprising: upon receipt of the modulated control signals, temporarily suspending the second call leg between the at least one second telephony device and the gateway; and when the modulated control signals have been sent and the modulated response signals have been received, re-establishing the second call leg between the at least one second telephony device and the gateway.

8. The method of claim 7, wherein the third call leg with the modem device is temporarily established and the second call leg with the one or more second telephony devices is temporarily suspended upon receipt of an instruction signal from at least one of the call control server and the wireless handheld telephony device.

9. The method of claim 8 wherein the instruction signal comprises a DTMF tone.

10. A system for controlling communications between a call control server, a wireless handheld telephony device, and at least one second telephony device, the system comprising a gateway having a data processor, media readable by the data processor, and a communications system;

the communications system adapted to process signals sent between the wireless handheld telephony device and the at least one second telephony device, via the gateway, the wireless handheld telephony device and the at least one second telephony device being in communication in a previously established communication session controlled by the call control server, the communication session having a first call leg between the wireless handheld telephony device and the gateway and at least a second call leg between the at least one second telephony device and the gateway; and the media readable by the data processor comprising coded program instructions adapted to cause the system to:

upon receipt of modulated control signals representing one or more data messages from the call control server, temporarily establish a third call leg between the gateway and a modem in communication with the call control server;

receive, at the gateway, the modulated control signals from the call control server via the established third call leg with the modem;

transmit the modulated control signals to the wireless handheld telephony device through the audio channel of the first call;

upon receipt of modulated response signals representing one or more data messages from the wireless handheld telephony device, transmit the modulated response signals to the modem via the established third call leg; and when the modulated control signals have been sent and the modulated response signals have been received, disconnecting the third call leg.

11. The system of claim 10, further comprising the modem configured to modulate signals received from the call control server and to demodulate signals received from the wireless handheld telephony device.

12. The system of claim 10, further comprising a media server, wherein the media further comprises coded program instructions to cause the system to establish the third call leg by the media server using a conference bridge.

13. The system of claim 10, further comprising a media server, wherein the media further comprises coded program instructions to cause the system to establish each call leg between the gateway and each of the wireless handheld telephony device and the one or more second telephony devices by the media server using a conference bridge.

14. The method of claim 12, wherein the conference bridge is established when the one or more signals are to be sent and the conference bridge is disabled after the one or more signals have been sent.

15. The method of claim 14, wherein the conference bridge is established upon receiving an instruction signal from one of the call control server and the wireless handheld telephony device.

16. The system of claim 10, wherein the media further comprises coded program instructions to cause the system to:

upon receipt of the modulated control signals, temporarily suspend the second call leg between the at least one second telephony device and the gateway; and when the modulated control signals have been sent and the modulated response signals have been received, re-establish the second call leg between the at least one second telephony device and the gateway.

17. The system of claim 16, wherein the third call leg with the modem device is temporarily established and the second call leg with the one or more second telephony devices is temporarily suspended upon receipt of an instruction signal from at least one of the call control server and the wireless handheld telephony device.

18. The system of claim 17 wherein the instruction signal comprises a DTMF tone.

* * * * *